United States Patent
Kennington et al.

(10) Patent No.: US 9,528,813 B2
(45) Date of Patent: Dec. 27, 2016

(54) OBJECT DIMENSIONING APPARATUS, SYSTEMS AND RELATED METHODS

(71) Applicant: Quantronix, Inc., Farmington, UT (US)

(72) Inventors: Robert L. Kennington, Farmington, UT (US); Brandon M. Taylor, Fruit Heights, UT (US); Eve A. Carlsruh, Layton, UT (US)

(73) Assignee: Quantronix, Inc., Farmington, UT (US)

( * ) Notice: Subject to any disclaimer, the term of this patent is extended or adjusted under 35 U.S.C. 154(b) by 237 days.

(21) Appl. No.: 14/308,333

(22) Filed: Jun. 18, 2014

(65) Prior Publication Data
US 2014/0373376 A1    Dec. 25, 2014

Related U.S. Application Data
(60) Provisional application No. 61/837,945, filed on Jun. 21, 2013.

(51) Int. Cl.
| | | |
|---|---|---|
| *G01B 7/02* | (2006.01) | |
| *G01B 5/00* | (2006.01) | |
| *G01B 21/02* | (2006.01) | |

(52) U.S. Cl.
CPC .............. *G01B 7/02* (2013.01); *G01B 5/0021* (2013.01); *G01B 21/02* (2013.01)

(58) Field of Classification Search
CPC ....................................................... G01B 7/02
USPC . 33/553, 1 V, 121, 122, 123, 549, 555, 3 A, 33/3 B, 3 C
See application file for complete search history.

(56) References Cited

U.S. PATENT DOCUMENTS

| | | | | |
|---|---|---|---|---|
| 2,688,878 A | * | 9/1954 | Kolisch | G01F 17/00 177/25.15 |
| 2,708,368 A | * | 5/1955 | Kolisch | G06G 7/48 177/25.11 |
| 2,736,095 A | * | 2/1956 | Krauss | G01F 17/00 33/1 R |
| 3,372,486 A | * | 3/1968 | Chow | G01F 17/00 235/61 GM |
| 5,042,015 A | * | 8/1991 | Stringer | G01B 11/002 367/96 |
| 5,485,082 A | | 1/1996 | Wisspeintner et al. | |
| 5,528,517 A | * | 6/1996 | Loken | G01D 21/00 33/1 V |
| 5,586,037 A | | 12/1996 | Gil et al. | |
| 5,689,446 A | * | 11/1997 | Sundman | A43D 1/02 33/3 A |
| 5,777,746 A | * | 7/1998 | Dlugos | G01B 11/02 177/25.15 |
| 5,914,464 A | | 6/1999 | Vogel | |
| 6,462,868 B1 | | 10/2002 | Giesberg et al. | |
| 6,477,514 B1 | | 11/2002 | Gil et al. | |

(Continued)

FOREIGN PATENT DOCUMENTS
WO    00/37885 A1    6/2000

OTHER PUBLICATIONS
International Search Report of the ISA/KR, Application No. PCT/US2014/043000, Oct. 22, 2014, four (4) pages.

(Continued)

*Primary Examiner* — Christopher Fulton
(74) *Attorney, Agent, or Firm* — TraskBritt

(57) ABSTRACT

Apparatus, methods and systems for obtaining one or more dimensions of an object employing, at least in part, touch sensors.

16 Claims, 5 Drawing Sheets

(56) References Cited

U.S. PATENT DOCUMENTS

| | | | | |
|---|---|---|---|---|
| 7,373,722 | B2* | 5/2008 | Cooper | G01B 11/02 33/1 V |
| 7,707,737 | B2* | 5/2010 | Lightfoot | G01B 3/08 33/700 |
| 8,928,896 | B2* | 1/2015 | Kennington | G01B 17/00 356/625 |
| 2003/0001869 | A1 | 1/2003 | Nissen | |
| 2005/0108111 | A1 | 5/2005 | Kranyec | |
| 2006/0155657 | A1 | 7/2006 | Schneeberger et al. | |
| 2008/0033738 | A1 | 2/2008 | Conard et al. | |
| 2009/0128293 | A1 | 5/2009 | Braun | |
| 2010/0153309 | A1 | 6/2010 | Asano et al. | |
| 2011/0125442 | A1 | 5/2011 | Schallmoser et al. | |
| 2012/0123970 | A1 | 5/2012 | Lorello et al. | |
| 2012/0133614 | A1 | 5/2012 | Bytheway et al. | |
| 2014/0182152 | A1* | 7/2014 | Towns | A43D 1/02 33/515 |

OTHER PUBLICATIONS

Written Opinion of the International Searching Authority, ISA/KR, Application No. PCT/US2014/043000, Oct. 22, 2014, eight (8) pages.
Atmel Corporation, "QTAN0030 Implementing a Long Slide Control Using a QMatrix™ IC", Application Note, © 2008, 8 pages.
Integrated Device Technology, "LDS6200 Touch Family", flyer, © 2010, 2 pages.

* cited by examiner

OBJECT DIMENSIONING APPARATUS, SYSTEMS AND RELATED METHODS

CROSS-REFERENCE TO RELATED APPLICATION

This application claims the benefit of U.S. Provisional Patent Application Ser. No. 61/837,945, filed Jun. 21, 2013, the disclosure of which is hereby incorporated herein in its entirety by this reference.

FIELD

Embodiments of the present disclosure relate generally to methods, apparatus and systems for taking dimensional measurements of objects and, more specifically, to methods, apparatus and systems employing touch sensors.

BACKGROUND

Millions of packages per year are handled and shipped by United Parcel Service, Federal Express, and many other smaller courier and delivery services. These packages originate with federal, state, and local governments as well as private businesses of all sizes. In many instances, the charges by the carriers to their customers are based on the so-called "dim-weight factor" or "dimensional weight factor" (DWF) of the article being shipped, a fictitious dimension based on length (L) times width (W) times height (H) in inches divided by a standard agency or association-recognized divisor or conversion factor, commonly 139 (L×W×H)/139) for international shipments and 166 (L×W×H)/166) for domestic U.S. shipments. The "139" and "166" divisors or conversion factors have been recognized and adopted by the International Air Transport Association (I.A.T.A.). Even if an object or package is of irregular configuration, the "dim weight," using the longest measurement each of length, width, and height, is still utilized for billing purposes. The volume computed by multiplication of object length, times width, times height may hereinafter be termed the "cubic volume," "spatial volume," or simply the "cube" of the object.

The measurements of the articles shipped are also critical so that the carrier can compute volume-based shipping charges; accurately determine the number of containers, trucks, trailers, or other vehicles required to transport goods to their destinations; and handlers of goods can optimize the use of space in retail as well as warehouse/distribution-center facilities. In addition, article weight and measurements may also be used to determine and predict weight and balance for transport vehicles and aircraft and to dictate the loading sequence for objects by weight and dimensions for maximum safety and efficiency. If orders of any items are to be packed into boxes, knowledge of object weight and dimensions is useful for determining box size, durability, packing sequence and product orientation.

Quantronix, Inc., Assignee of Applicants' invention as described and claimed herein, has developed and commercialized a number of different dimensioning systems for a wide variety of applications in commerce and industry. However, there remains a need for compact, relatively inexpensive dimensioning apparatuses for relatively low-volume applications, such as retail outlets and packaging stores, as well as other small businesses that employ UPS, FedEx and other courier services for shipping small volumes (e.g., under fifty pounds), of packages daily.

It has been proposed to employ touchscreen technology to dimension envelopes for mailing via the United States Postal Service (USPS), as described in U.S. Patent Publication No. 2012/0123970. However, the apparatus described employs a substantially vertical, two-dimensional touchscreen of a mail kiosk, which is costly and consumes an inordinate amount of space, as well as being unsuitable for measurement of three-dimensional objects, such as cuboidal packages shipped by courier.

BRIEF SUMMARY

Embodiments of the disclosure comprise touchscreen-based dimensioning methods, apparatus and systems.

In one embodiment, an object dimensioning apparatus comprises at least one sensor element configured to generate a signal corresponding to at least one linear distance of at least one location on the at least one sensor element with respect to a reference location responsive to touch of the at least one sensor element at the location, and a back surface above the reference location of at least one associated sensor element extending perpendicular to a plane of the at least one associated sensor element.

In another embodiment, an object dimensioning apparatus comprises a capacitive touchscreen sensor element with slider capability and configured to generate an outline of an object resting upon the sensor element responsive to a continuous touch about a periphery of the object.

In a further embodiment, a method of determining at least one dimension of an object comprises placing an object on at least one sensor element configured to be responsive to touch, touching the at least one sensor element on at least one location thereon, and determining, responsive to the signal and using a processor, at least one linear distance of a location of the touch with respect to a reference location.

In yet another embodiment, a method of determining at least one dimension of an object comprises placing an object on a capacitive touchscreen sensor element with slider capability and configured to generate a signal representative of an outline of an object resting upon the sensor element responsive to a substantially continuous touch about a periphery of the object, touching the sensor element substantially continuous about a periphery of the object, and determining, responsive to the signal and using a processor, at least one dimension of the object.

BRIEF DESCRIPTION OF THE DRAWINGS

The present disclosure will be more fully understood by one skilled in the art through a review of the following detailed description of the preferred embodiments taken in conjunction with the accompanying drawings wherein.

DETAILED DESCRIPTION

Figure 1A:
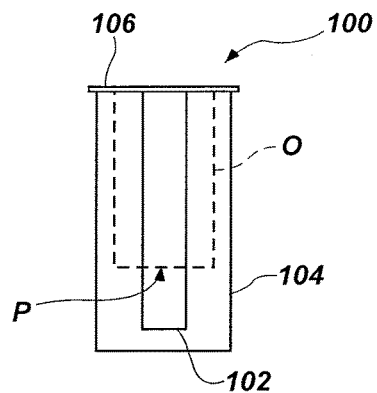
FIGS. 1A and 1B comprise, respectively, a top elevation and a side elevation of a first embodiment of a dimensional sensor apparatus of the disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

As used herein, the terms "touchscreen sensor" and "sensor" without further qualification, generally refer to a sensor that responds to (e.g., senses) one or more focused touches, such as may be applied by a finger, a finger nail, a gloved finger, a pen, a stylus, or other pointed object. The terms "focused touches" and "touches" as used herein encompass proximity of the pointed object to the sensor and sensor responses to the proximity of the pointed object, and not requiring any specific level of force or even measureable physical contact force. Widely employed touchscreen technologies may be generally categorized as "resistive touch," "capacitive touch," "metal over cap," and "capacitive slider touch" technologies. Other known touchscreen technologies include infrared grid, infrared acrylic projection, optical imaging, dispersive signal, and acoustic pulse recognition.

Resistive touchscreens are made of two sheets, each sheet coated with a layer of resistive material. When contact with the touchscreen is made, the two sheets are pressed together and through a grid of horizontal and vertical lines of the resistive material in the case of two-dimensional touchscreens, horizontal on one sheet and vertical on the other, the location of the touch can be determined. A voltage is applied to one resistive layer, and sensed by the other. When the two layers touch and connect, the panel behaves as a pair of voltage dividers, one axis at a time. Some characteristics of resistive touch technology are relatively low cost, higher accuracy than capacitive touchscreens, the requirement for greater touch force, and more susceptibility to damage.

Capacitive touchscreens comprise an insulator coated with a conductor. When the coating is touched with a conductive material, such as a bare finger or conductive stylus, the electrostatic field of the screen is distorted, which is measurable as a change in capacitance. Capacitive touchscreens are less accurate than resistive touchscreens, more sensitive to a lighter touch force, exhibit degraded performance in cold environments, are more expensive than resistive touchscreens, can detect multiple touches simultaneously, and have a lower power consumption than resistive touchscreens. Known capacitive touchscreen technologies may be further categorized as employing surface capacitance, projected capacitance, mutual capacitance and self-capacitance.

Metal over cap touchscreens use technology similar to capacitive touch, but rely on deflection of the screen material to reduce the distance between two conductors, raising the capacitance. This approach eliminates the requirement that a conductive stylus or bare finger be used to contact the screen.

Capacitive slider touchscreens are able to detect finger slides and are programmed to respond to the slide, for example, by providing a zoom function responsive to two-finger pinch and spread movements such as are offered on IPODs®, IPHONEs®, IPADs® and other smart phones and tablet devices. Examples of such technology are described in Application Note QTAN0030, entitled "Implementing a Long Slide Control Using a QMATRIX™ IC, Atmel Corporation, San Jose, Calif., the disclosure of which is incorporated herein by reference, and in the IDT LDS6200 Touch Family Flyer, Integrated Device Technology, Inc., San Jose, Calif., the disclosure of which is also incorporated herein by reference.

The term "sensor" as used herein may refer to a sensor configured to provide a distance (e.g., dimension) indication in at least one dimension (e.g., X, Y and/or Z planes) responsive to one or more focused touches of the sensor by an object or point proximity to the sensor by an object.

While conventional touchscreen technology is configured to provide a two-dimensional (e.g., X and Y) positional indication of a focused touch on the touchscreen sensor, the inventors herein conceived of a resistive touchscreen sensor configured to measure only a single dimension, such sensors being referred to herein as "linear sensor strips" and identified by reference numeral 102. However, the sensor circuit employed, while elongated and linear, may be formed or placed on a substrate of another configuration. Details of an embodiment of a linear sensor strip 102 and its operation are described below with reference to FIGS. 10A through 10E.

Embodiments of the present disclosure employ touchscreen technology to determine dimensions of an object, typically a cuboidal object, but not so limited.

Figure 1B:
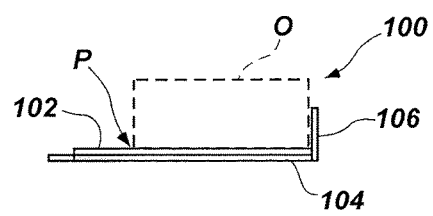

In a first embodiment, as illustrated in FIGS. 1A and 1B, a dimensional sensor apparatus 100, which may also be characterized as an object dimensioning apparatus, may comprise a linear sensor strip 102, which may also be characterized as a linear sensor element, mounted to a flat, rigid or flexible mat 104. Details of an embodiment of linear sensor strip 102 are described below, with reference to FIGS. 10A through 10E. Mat 104 may comprise, or be placed against, a rigid back surface 106 in use. A cuboidal object O (e.g., a box), as shown in broken lines, is placed on the linear sensor strip 102 with a first side against the back surface 106. The linear sensor strip 102 is then touched at a point P immediately adjacent to the side of the object O opposite and parallel to the first side resting against the back surface 106. The resulting electrical signal is pre-calibrated and processed to produce a linear measurement (for example, object length) between the back surface 106 and touch point P. The object O is rotated 90°, for example, about a vertical axis, and a second different side thereof is placed against the back surface 106, and linear sensor strip 102 is touched again at a point P immediately adjacent a side of the box opposite and parallel to the second, different side resting against the back surface 106. The resulting electrical signal is pre-calibrated and processed to produce a linear measurement (for example, object width) between the back surface 106 and touch point P. The object O is again rotated 90°, for example, about a horizontal axis, and a third different side thereof perpendicular to the first and second sides is placed against the back surface 106, and linear sensor strip 102 is touched again at a point P immediately adjacent a side of the object O opposite and parallel to the third different side resting against the back surface 106. The resulting electrical signal is pre-calibrated and processed to produce a linear measurement (for example, object height) between the back surface 106 and touch point P. From the three dimensions so obtained, a volume of the object may be manually or automatically calculated. In an automatic implementation, a processor used to convert the electrical signals may be further programmed to calculate object volume for display or other output responsive to a signal indicative of a third touch to the linear sensor strip 102 upon completion of the height calculation, responsive to touch of another portion of the linear sensor strip 102 or to two consecutive touches within a short (e.g., less than one second) interval.

In application, linear sensor strip 102, optionally on mat 104, may be placed onto a countertop adjacent a wall to be used as back surface 106, or linear sensor strip 102 may have a back surface 106 comprised of an L-shaped member in cross-section, with one leg of a longitudinal axis L secured to and parallel to mat 104 and the other extending perpendicular to and above mat 104. In another application, linear sensor strip 102 on mat 104 may be secured in a vertical orientation on a wall or side of a cabinet, adjacent to a flat countertop, the countertop acting as back surface 106.

Figure 2A:
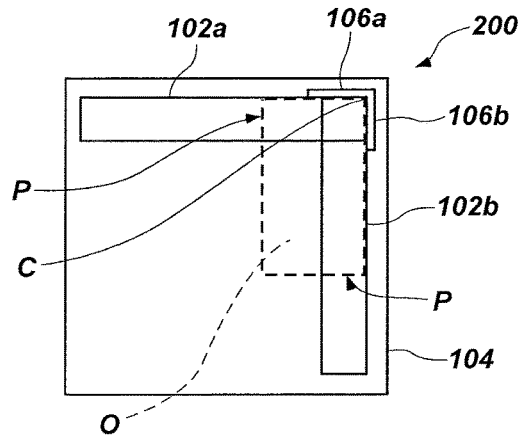
FIGS. 2A and 2B comprise, respectively, a top elevation and a side elevation of a second embodiment of a dimensional sensor apparatus of the disclosure.
Figure 2B:
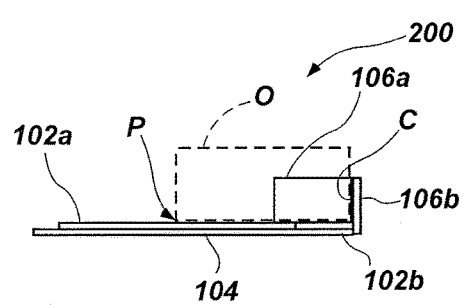

In a second embodiment, as illustrated in FIGS. 2A and 2B, a dimensional sensor apparatus 200, which may also be characterized as an object dimensioning apparatus, may comprise two linear sensor strips 102*a* and 102*b*, mounted at a 90° included angle and optionally to a flat, rigid or flexible mat 104. Two rigid back surfaces 106*a*, 106*b* create a 90° corner C at an apex of the included angle of the two linear sensor strips 102*a*, 102*b*. In use, a cuboidal object O, as shown in broken lines, is placed on the two linear sensor strips 102*a*, 102*b* simultaneously, with a corner of the object O nestled in the corner C between back surfaces 106*a*, 106*b*. Each linear sensor strip 102*a*, 102*b* is then touched, either simultaneously or serially, at a point P immediately adjacent a side of the object O opposite and parallel to a respective side of object O resting against a back surface 106*a* or 106*b*. The resulting electrical signal from each touch is pre-calibrated and processed to produce a linear measurement, for example, object length and width. The object O is then rotated 90°, for example, about a horizontal axis, to determine a dimension of its third side, rested in corner C and one of the linear sensor strips 102*a*, 102*b* is touched at a point P immediately adjacent a side of the object O opposite and parallel to the third side resting against a back surface 106*a*, 106*b* and the resulting electrical signal from the third touch is pre-calibrated and processed to produce a linear measurement, for example, object height. From the three dimensions, a volume of the object may be manually or automatically calculated. In an automatic implementation, a processor used to convert the electrical signals may be further programmed to calculate object volume for display or other output responsive to a signal indicative of the third touch to a linear sensor strip upon completion of the height calculation, or responsive to touch of another portion of one of the linear sensor strips, or to two consecutive touches within a short (e.g., less than one second) interval.

In application, the two linear sensor strips 102*a*, 102*b*, optionally on a mat 104, may be placed onto or in a countertop. Back surfaces 106*a*, 106*b* may be formed from a backsplash corner of the countertop, a corner fixture may be secured to the countertop, or the mat 104 may be equipped with back surfaces 106*a*, 106*b* secured thereto. Linear sensor strips 102*a*, 102*b* may alternatively be placed in or on a wall surface, directly or on a mat 104, with one strip 102*a* situated horizontal to and adjacent a countertop below the wall and the other linear sensor strip 102*b* extending vertically above the countertop. The countertop provides at least one back surface 106*a*, while another back surface 106*b* to provide corner C may be provided, for example, by a countertop backsplash, or by (for example) an L-shaped member with one leg of the L secured to the wall or to the countertop and the other leg extending perpendicular to the wall and to the countertop at the apex A of the included 90° angle between the two linear sensor strips 102*a*, 102*b*.

Figure 3A:
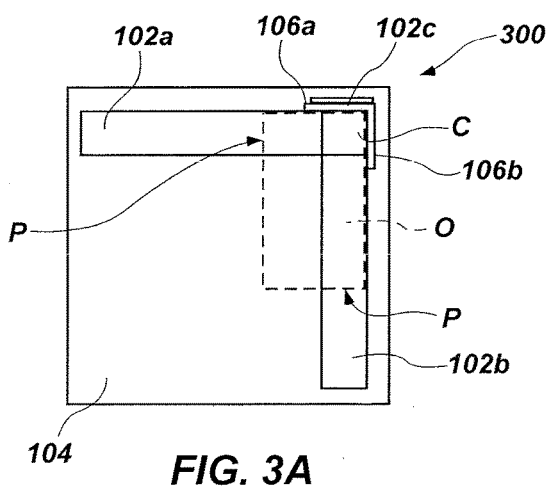
FIGS. 3A and 3B comprise, respectively, a top elevation and a side elevation of a third embodiment of a dimensional sensor apparatus of the disclosure.
Figure 3B:
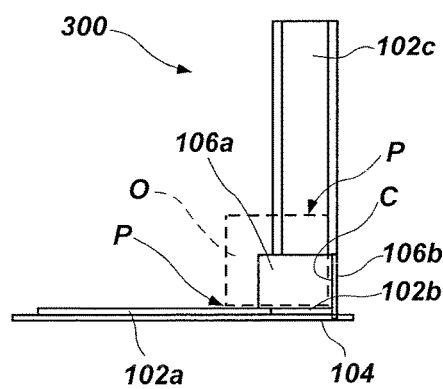

In a third embodiment, illustrated in FIGS. 3A and 3B, a dimensional sensor apparatus 300, which may also be characterized as an object dimensioning apparatus, may comprise two linear sensor strips 102*a* and 102*b*, mounted at a 90° included angle optionally to a flat, rigid or flexible mat 104. Two rigid back surfaces 106*a*, 106*b* create a 90° corner C at an apex of the included angle of the two linear sensor strips 102*a*, 102*b*. A third linear sensor strip 102*c* is mounted vertically adjacent to and substantially coplanar with one of the back surfaces 106*a*, 106*b*. In use, a cuboidal object O, as shown in broken lines, is placed on the two linear sensor strips 102*a*, 102*b* simultaneously with a corner of the object O nestled in the corner C between back surfaces 106*a*, 106*b* and one side of object O adjacent to vertical linear sensor strip 102*c*. Each linear sensor strip 102*a*, 102*b*, 102*c* is then touched, either simultaneously or serially, at a point P immediately adjacent a side of the object O opposite and parallel to a respective side of object O resting against a back surface 106*a* or 106*b* and to the side resting on mat 104. The resulting electrical signal from each touch is pre-calibrated and processed to produce a linear measurement, for example, object length, width and height. From the three dimensions, a volume of the object may be manually or automatically calculated. In an automatic implementation, the processor used to convert the electrical signals may be further programmed to calculate object volume for display or other output responsive to a signal indicative of the third touch to a linear sensor strip upon completion of the height calculation, or responsive to touch of another portion of one of the linear sensor strips, or to two consecutive touches within a short (e.g., less than one second) interval.

In application, the two linear sensor strips 102*a*, 102*b* may be placed, optionally on a mat 104, onto or in a countertop. Back surfaces 106*a*, 106*b* may be formed from a backsplash corner of the countertop, the mat 104 may be equipped with back surfaces 106*a*, 106*b* secured thereto, or a corner fixture may be secured to the countertop. Third linear sensor strip 102*c* may be rigidly mounted against a vertical extension of one of the back surfaces 106a, 106b. Two-dimensional linear sensor strips 102a, 102b may alternatively be placed in or on a wall surface, directly or on a mat 104, with one strip 102a situated horizontal to and adjacent a countertop below the wall and the other linear sensor strip 102b extending vertically above the countertop, with third linear sensor strip 102c being mounted horizontally either to the wall or to the countertop, perpendicular to both other linear sensor strips 102a, 102b. The countertop provides at least one back surface 106a, while another back surface 106b is provided by the wall and a third back surface may be provided, for example, by a countertop backsplash, or by (for example) an L-shaped member with one leg of the L secured to the wall or to the countertop and the other leg extending perpendicular to the wall and to the countertop at the apex A of the included 90° angle between the two linear sensor strips 102a, 102b.

Figures 4A, 4B:
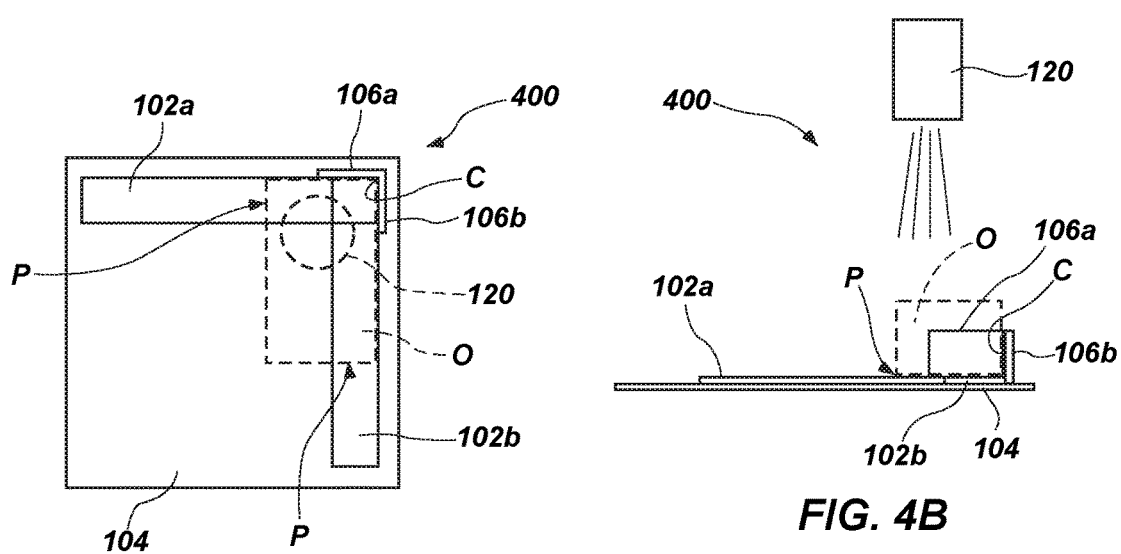
FIGS. 4A and 4B comprise, respectively, a top elevation and a side elevation of a fourth embodiment of a dimensional sensor apparatus of the disclosure.

In a fourth embodiment, illustrated in FIGS. 4A and 4B, a dimensional sensor apparatus 400, which may also be characterized as an object dimensioning apparatus, may comprise two linear sensor strips 102a and 102b, mounted at a 90° included angle optionally to a flat, rigid or flexible mat 104. Two rigid back surfaces 106a, 106b create a 90° corner C at an apex A of the included angle of the two linear sensor strips 102a, 102b. In use, a cuboidal object O, as shown in broken lines, is placed on the two linear sensor strips 102a, 102b simultaneously with a corner of the object nestled in the corner C between back surfaces 106a, 106b. Each linear sensor strip 102a, 102b is then touched, either simultaneously or serially, at a point P immediately adjacent a side of the object O opposite and parallel to a respective side of object O resting against a back surface 106a or 106b. The resulting electrical signal from each touch is pre-calibrated and processed to produce a linear measurement, for example, object length and width. Unlike the second embodiment, however, the third object dimension, for example, height, may be measured using an ultrasound distance sensor or a laser range sensor 120 (shown in broken lines, for clarity, in FIG. 4A mounted above the corner C and aimed perpendicular to the surface on which linear sensor strips 102a, 102b rest. Ultrasound distance sensor or laser range sensor 120 may be triggered to produce an electrical signal indicative of the third dimension and converted as necessary for processing, independent of linear sensor strips 102a, 102b, or may be triggered responsive to a touch of one or both of the strips. From the three dimensions, a volume of the object may be manually or automatically calculated. In an automatic implementation, the processor used to convert the electrical signals may be further programmed to calculate object volume for display or other output responsive to a user input signal, which may be a sensor trigger signal or an input independent of same.

In application, the two linear sensor strips 102a, 102b may be placed, optionally on a mat 104, onto or in a countertop. Back surfaces 106a, 106b may be formed from a backsplash corner of the countertop, the mat 104 may be equipped with back surfaces 106a, 106b secured thereto, or a corner fixture may be secured to the countertop. Ultrasound distance sensor or a laser range sensor 120 may be mounted above corner C using a fixture secured to an adjacent wall, or to (for example) an L-shaped fixture secured to and extending above the countertop with the sensor 120 at the distal end of a horizontal leg of the L. Linear sensor strips 102a, 102b may alternatively be placed in or on a wall surface, directly or on a mat 104, with one linear sensor strip 102a situated horizontal to and adjacent a countertop below the wall and the other linear sensor strip 102b extending vertically above the countertop. The countertop provides at least one back surface 106a, while another back surface 106b to provide corner C may be provided, for example, by a countertop backsplash, or by (for example) an L-shaped member with one leg of the L secured to the wall or to the countertop and the other leg extending perpendicular to the wall and to the countertop at the apex A of the included 90° angle between the two linear sensor strips 102a, 102b. Ultrasound sensor or a laser range sensor 120 may be supported on the countertop and aimed perpendicular to the wall adjacent corner C.

Figures 5A, 5B:
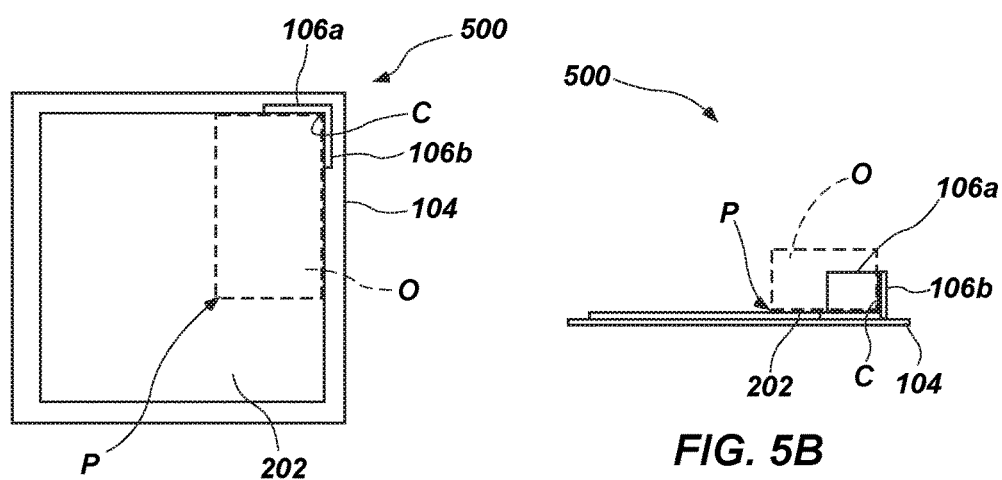
FIGS. 5A and 5B comprise, respectively, a top elevation and a side elevation of a fifth embodiment of a dimensional sensor apparatus of the disclosure.

In a fifth embodiment, illustrated in FIGS. 5A and 5B, a dimensional sensor apparatus 500, which may also be characterized as an object dimensioning apparatus, may comprise a two-dimensional sensor 202, for example, a rectangular sensor, which may be mounted optionally to a flat, rigid or flexible mat 104. Two rigid back surfaces 106a, 106b create a 90° corner C at an apex of the included angle of a corner of two-dimensional sensor 202. In use, a cuboidal object O, as shown in broken lines, is placed on the two-dimensional sensor 202 with a corner of the object nestled in the corner C between back surfaces 106a, 106b. A single touch is made on the two-dimensional sensor 202 at a point P immediately adjacent a corner of object O opposite the corner of object O nestled in corner C to produce a signal that is processed to produce two dimensions of object O, for example, length and width. Object O is rotated 90°, for example, about a horizontal axis, and placed against corner C and another, single touch is made to produce a signal from which the third dimension, for example, height, is produced. The resulting electrical signal from each touch is pre-calibrated and processed to produce a linear measurement, for example, object length, width and height. From the three dimensions, a volume of the object may be manually or automatically calculated. In an automatic implementation, the processor used to convert the electrical signals may be further programmed to calculate object volume for display or other output responsive to a signal indicative of the second touch to the two-dimensional sensor 202 upon completion of the height calculation, or to two consecutive touches within a short (e.g., less than one second) interval.

In application, the two-dimensional sensor 202 may be mounted either on a countertop or vertically against a wall. In the former case, back surfaces 106a, 106b may be provided by a countertop backsplash corner or an installed L-shaped member on the countertop. In the latter case, back surfaces 106a, 106b may be provided by a countertop surface and backsplash, or a countertop surface and an installed flange projecting perpendicular to the wall and the countertop surface and secured to either.

Figures 6A, 6B:
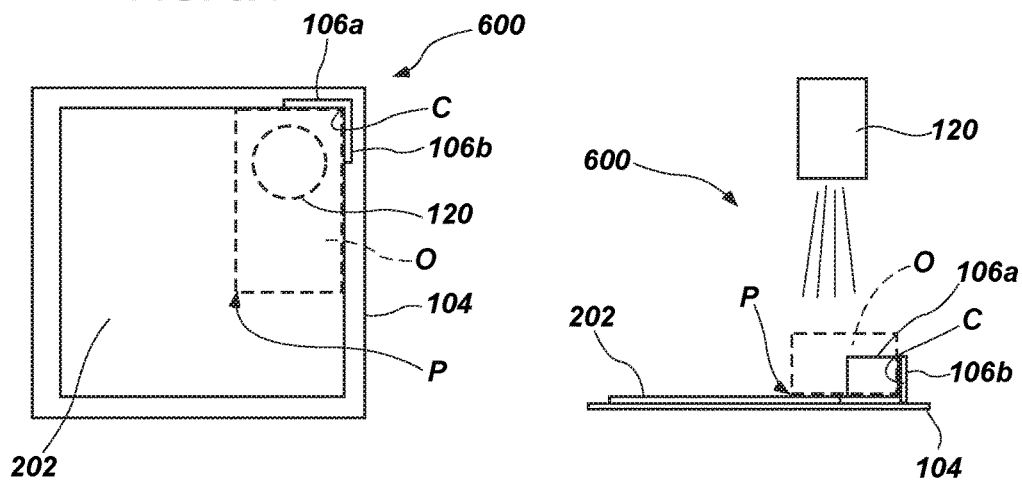
FIGS. 6A and 6B comprise, respectively, a top elevation and a side elevation of a sixth embodiment of a dimensional sensor apparatus of the disclosure.

In a sixth embodiment, illustrated in FIGS. 6A and 6B, a dimensional sensor apparatus 600, which may also be characterized as an object dimensioning apparatus, may comprise a two-dimensional sensor 202, for example, a rectangular sensor, which may be mounted optionally to a flat, rigid or flexible mat 104. Two rigid back surfaces 106a, 106b create a 90° corner C at an apex of the included angle of a corner of two-dimensional sensor 202. In use, a cuboidal object O, as shown in broken lines, is placed on the two-dimensional sensor 202 with a corner of the object O nestled in the corner C between back surfaces 106a, 106b. A single touch is made on two-dimensional sensor 202 immediately adjacent a corner of object O opposite the corner nestled in corner C to produce a signal that is processed to produce two dimensions of object O, for example, length and width. The third object dimension, for example, height, may be measured using an ultrasound distance sensor or a laser range sensor 120 (shown in broken lines in FIG. 6A for clarity) mounted above the corner C and aimed perpendicular to the surface on which two-dimensional sensor 202 rests. Ultrasound distance sensor or laser range sensor 120 may be triggered to produce an electrical signal indicative of the third dimension and converted as necessary for processing, independent of two-dimensional sensor 202, or may be triggered responsive to a touch of two-dimensional sensor 202. From the three dimensions, a volume of the object may be manually or automatically calculated. In an automatic implementation, the processor used to convert the electrical signals may be further programmed to calculate object volume for display or other output responsive to a user input signal, which may be a sensor trigger signal or an input independent of same.

In application, the two-dimensional sensor 202 may be mounted either on a countertop or vertically against a wall. In the former case, back surfaces 106*a*, 106*b* may be provided by a countertop backsplash corner or an installed L-shaped member on the countertop. Ultrasound sensor or a laser range sensor 120 may be mounted above corner C using a fixture secured to an adjacent wall, or to (for example) an L-shaped fixture secured to and extending above the countertop with the sensor 120 at the distal end of a horizontal leg of the L. In the latter case, back surfaces 106*a*, 106*b* may be provided by a countertop surface and backsplash, or a countertop surface and an installed flange projecting perpendicular to the wall and the countertop surface and secured to either. Ultrasound distance sensor or a laser range sensor 120 may be supported on the countertop and aimed perpendicular to the wall adjacent corner C.

Figure 7A:
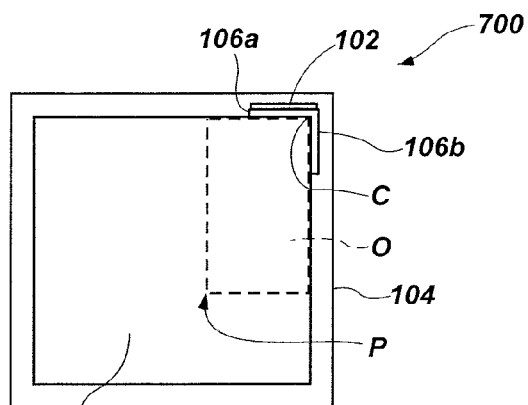
FIGS. 7A and 7B comprise, respectively, a top elevation and a side elevation of a seventh embodiment of a dimensional sensor apparatus of the disclosure.
Figure 7B:
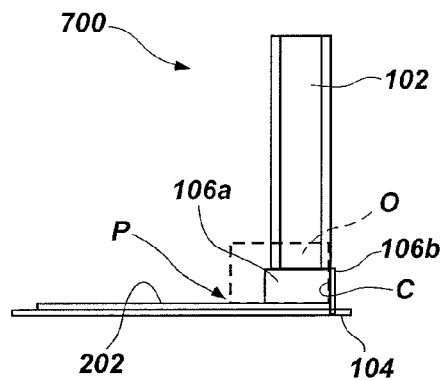

In a seventh embodiment, illustrated in FIGS. 7A and 7B, a dimensional sensor apparatus 700, which may also be characterized as an object dimensioning apparatus, may comprise a two-dimensional sensor 202, for example, a rectangular sensor, which may be mounted optionally to a flat, rigid or flexible mat 104. Two rigid back surfaces 106*a*, 106*b* create a 90° corner C at an apex of the included angle of a corner of two-dimensional sensor 202. In use, a cuboidal object O, as shown in broken lines, is placed on the two-dimensional sensor 202 with a corner of the object O nestled in the corner C between back surfaces 106*a*, 106*b*. A single touch is made on two-dimensional sensor 202 immediately adjacent a corner of object O opposite the corner nestled in corner C to produce a signal that is processed to produce two dimensions of object O, for example, length and width. The third object dimension, for example, height, may be measured using a linear sensor strip 102 extending vertically above (e.g., perpendicular to) two-dimensional sensor 202 adjacent one of the back surfaces 106*a*, 106*b*, a touch on vertical linear sensor 102 producing a signal from which height of object O may be determined. From the three dimensions, a volume of the object O may be manually or automatically calculated. In an automatic implementation, the processor used to convert the electrical signals may be further programmed to calculate object volume for display or other output responsive to a signal indicative of the touch to a linear sensor strip upon completion of the height calculation, or responsive to touch of another portion of the two-dimensional sensor 202 or the linear sensor strip 102, or to two consecutive touches of either within a short (e.g., less than one second) interval.

In application, the two-dimensional sensor 202 may be mounted either on or in a countertop or vertically against a wall. In the former case, back surfaces 106*a*, 106*b* may be provided by a countertop backsplash corner or an installed L-shaped member on the countertop. Linear sensor strip 102 may be mounted to an adjacent wall, to a vertical extension of one of back surfaces 106*a*, 106*b*, or to a separate vertical member. In the latter case, back surfaces 106*a*, 106*b* may be provided by a countertop surface and backsplash, or a countertop surface and an installed flange projecting perpendicular to the wall and the countertop surface and secured to either. Linear sensor strip 102 may be mounted on or in the countertop surface perpendicular to the plane of two-dimensional sensor 202.

Figure 8:
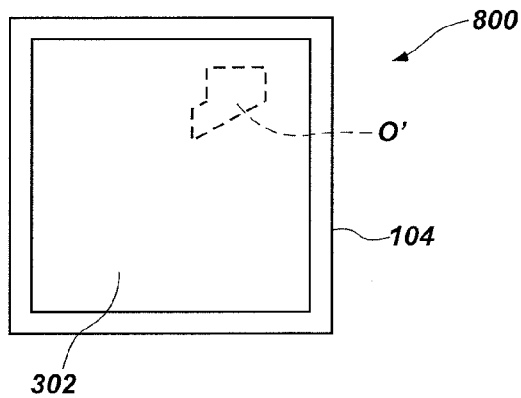
FIG. 8 comprises a top elevation of an eighth embodiment of a dimensional sensor apparatus of the disclosure.

In an eighth embodiment, illustrated in FIG. 8, a dimensional sensor apparatus 800, which may also be characterized as an object dimensioning apparatus, may comprise a two-dimensional, for example, rectangular, capacitive touchscreen sensor 302 with slider detection capability, as described in the literature referenced above and incorporated herein from Atmel Corporation and Integrated Device Technology, Inc. Output from two-dimensional capacitive touchscreen sensor 302 with slider capability may be used by a suitably programmed microprocessor to process a signal corresponding to a finger, stylus or other pointed object tracing an outline of a non-cuboidal object O' on the sensor surface to return two-dimensional measurements (e.g., maximum length and width dimensions) of the non-cuboidal object O'. A vertical linear sensor strip 102 (see FIG. 7B) or an ultrasound distance sensor or a laser range sensor 120 (see FIG. 7B) oriented perpendicular to two-dimensional capacitive touchscreen sensor 302 may be used to determine object height, or the object may be rotated 90° about a horizontal axis to a vertical position, and an outline of the object so positioned may be traced and the resulting signal processed to return a third dimensional measurement (e.g., maximum height) of the object.

It is further contemplated that any of the embodiments described above may be used in conjunction with a scale (such term as used herein including, by way of example and not limitation, one or more load cells) for determining object weight, the scale being integrated into a measuring surface or associated as a separate device. The resulting weight information may be combined with the dimensional information to provide complete object measurement information, including cubic volume and, if desired, dim weight.

Figure 9:
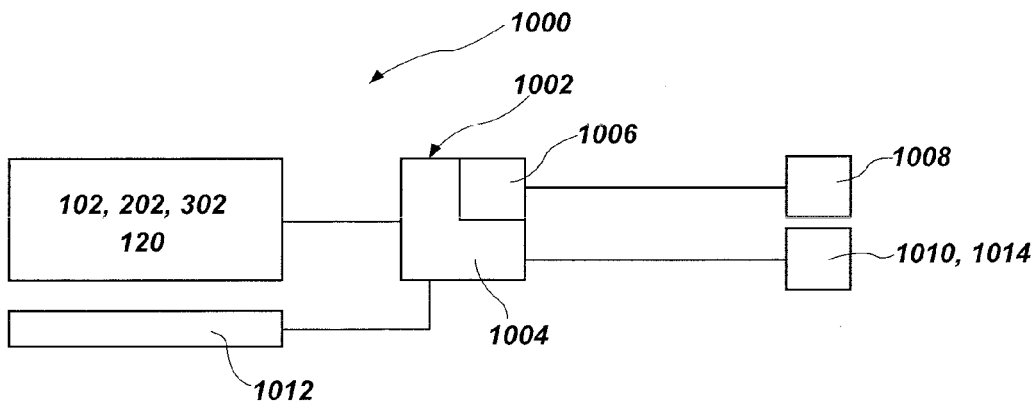
FIG. 9 comprises a schematic of a system comprising one or more dimensional sensor components according to an embodiment of the disclosure in combination with a controller and peripheral devices.
Figure 10A:
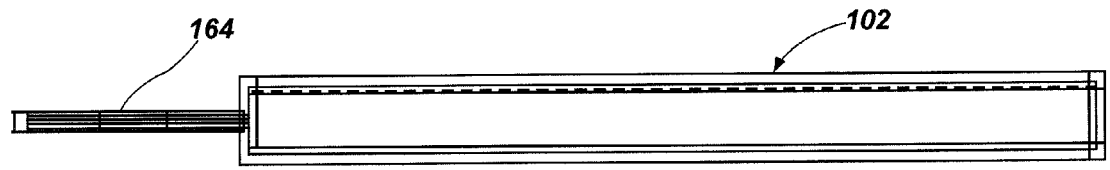
FIGS. 10A, 10B, 10C, 10D and 10E comprise, respectively, a top view of a linear sensor strip assembly of an embodiment of the disclosure, a side view of the linear sensor strip assembly, a top elevation of a top circuit, a top elevation of a bottom circuit, and a top elevation of front and rear gaskets of the assembly.
Figure 10B:
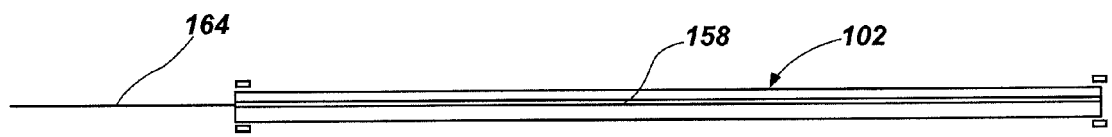
Figure 10C:
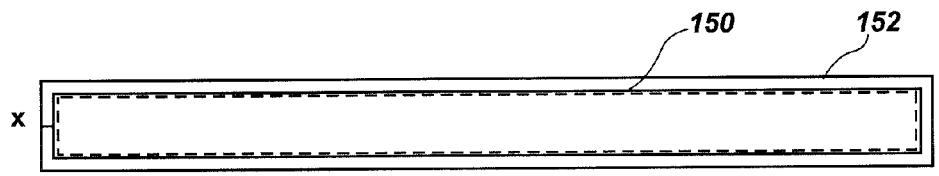
Figure 10D:
Figure 10E:
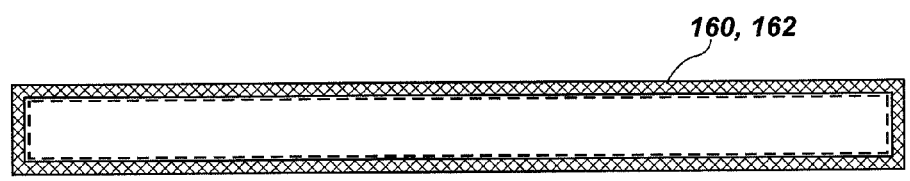

Referring to FIG. 9, a system 1000 incorporating one or more linear sensor strip(s) 102, a two-dimensional sensor 202, or a two-dimensional capacitive touchscreen sensor 302 and optionally an ultrasound distance sensor or laser range finder sensor 120 according to one or more of the embodiments of dimensional sensor apparatuses described herein are operably coupled (via signal conversion circuitry, for example, A/D converter(s), not shown) to a controller 1002 comprising, for example, programmed microprocessor 1004 and memory 1006, which, in turn, is operably coupled to an input device 1008, an output device in the form of a printer and/or a display 1010 and, optionally, to a scale 1012. A network interface 1014 may also be employed as an output device for data transmission to a computer employed for customer transactions. Operation of system 1000 is as described above with reference to the various embodiments.

Referring to FIGS. 10A through 10E, resistive sensors 102, also referred to herein as "linear sensor strips 102," comprise a laminate assembly comprising a 3-wire resistive touchscreen. Components include top circuit 150 on an indium tin oxide (ITO) coated polymer substrate 152, a bottom circuit 154 on an ITO coated glass substrate 156, and spacer 158 between substrates 152 and 156, the substrates oriented with the ITO coatings mutually facing. Optional top and/or bottom gaskets 160 and 162 may be positioned above substrate 152 and below substrate 156, respectively, for use in mounting linear sensor strip 102 to a support. Top circuit 150 is coupled to an X pin of 3-pin connector 164, while bottom circuit 154 is coupled to X− and X+ pins of 3-pin connector 164. X+ is employed for positive excitation, and may be connected to Vcc, while X− is employed for negative excitation, and may be connected to GND. X is used for touch sensing. In use, touch pressure on substrate 152 causes an inward flex of the substrate, making contact between the ITO coating on substrate 152 and that on substrate 156, resulting in a voltage drop that may be detected by a controller in the form of a microprocessor. Due to the configuration and mutual arrangement of top circuit 150 and bottom circuit 154, touch pressure results in a signal corresponding to a linear dimension from the connector end of the assembly along the longitudinal axis of resistive touchscreen sensor 102.

Figure 11:
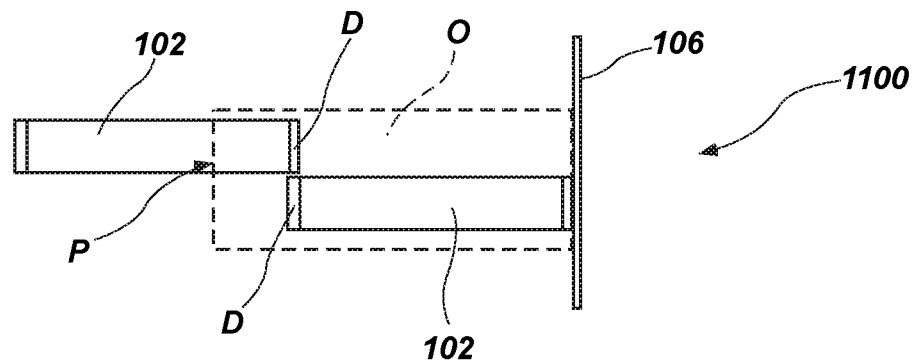
FIG. 11 comprises a top elevation of a ninth embodiment of a dimensional sensor apparatus of the disclosure.

Referring to FIG. 11, in circumstances where a cuboidal object O includes one or more dimensions that exceed the length of a linear sensor strip 102 due to manufacturing constraints involved in fabricating the assembly, in a ninth embodiment of a three-dimensional sensor apparatus 1100 two (or more) such linear sensor strips 102 may be placed in laterally offset, partially longitudinally overlapping relationship as depicted to accommodate dead spaces D at the ends of each such linear sensor strips 102 where no sensing circuits 150, 154 (FIGS. 10C, 10D) are present and enable measurement of greater dimensions. In use, a side of object O is placed against a back surface 106 and a touch is made to the linear sensor strip 102 at a point P immediately adjacent the opposing side. Multiple linear sensor strips may be employed in any of the foregoing embodiments or in the embodiment of FIG. 12, wherever use of a single linear sensor strip is described.

Figure 12:
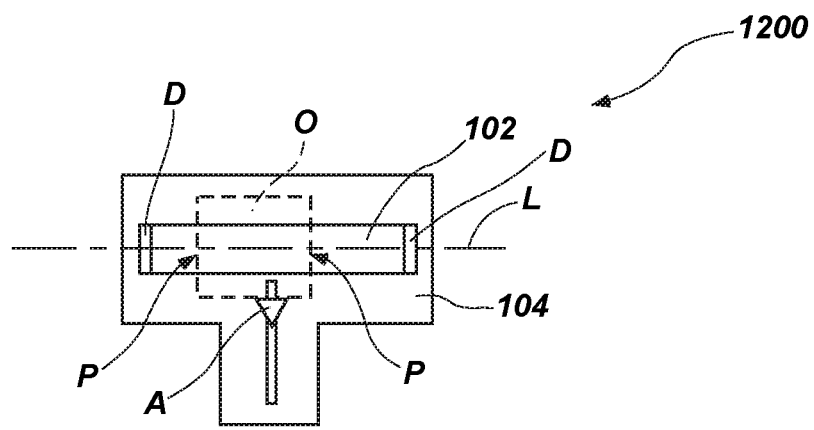
FIG. 12 comprises a top elevation of a tenth embodiment of a dimensional sensor apparatus of the disclosure.

Referring to FIG. 12, it is also contemplated that a tenth embodiment in the form of an extremely simple three-dimensional sensor apparatus 1200 may be implemented with a single linear strip sensor 102, or multiple associated linear strip sensors 102 as described above with respect to FIG. 11. In apparatus 1200, a single sensor 102 may be supported, optionally on a mat 104, on a horizontal (for ease of use) supporting surface such as a countertop. A cuboidal object O having each maximum dimension (e.g., length, width and height) less than a length of sensor 102 between dead spaces D at the ends thereof, may be placed on sensor 102 with a pair of opposing object sides perpendicular to the length of sensor 102 and sensor 102 touched at points P immediately adjacent opposing sides of object O. If desired, a slidable alignment element A with a linear surface facing and parallel to a longitudinal axis L of sensor 102, the slidable alignment element A being movable in a direction substantially coplanar with a plane of sensor 102 and perpendicular to axis L of sensor 102, may be incorporated with mat 104 to assist in aligning sides of cuboidal object O perpendicular to the longitudinal axis L of sensor 102 for enhanced measurement accuracy. The difference between a distance measured from each of the two touch points P and a zero point on sensor 102 is then determined by a processor programmed to convert the touch signals to corresponding distances and then subtract the two distances to provide a first object dimension (e.g., length). The object O may then be rotated 90° about a vertical axis on sensor 102, the sensor again touched twice to determine a second object dimension (e.g., width) from the difference in the two distances, and rotated again 90° about a horizontal axis and sensor 102 touched twice to determine a third object dimension (e.g., height) from the difference between the final two distances.

Of course, the touch signals may first be converted from analog to digital, the difference in signal magnitude determined, and then converted subsequently to an object dimension.

Many additions, deletions, and modifications to the described embodiments may be made without departing from the scope of the disclosure as hereinafter claimed. Further, the present disclosure may be embodied in other specific forms without departing from the scope of the disclosure. The described embodiments are to be considered in all respects only as illustrative and not restrictive. The scope of the disclosure is, therefore, encompassed by the appended claims and legal equivalents rather than by the foregoing description and accompanying drawings.

What is claimed is:

1. An object dimensioning apparatus, comprising:
at least one linear sensor strip oriented in a horizontal plane and comprising a resistive touchscreen configured to generate a signal corresponding to linear distances of any respective location only along a longitudinal axis of the at least one linear sensor strip with respect to a reference location responsive to touch of the at least one linear sensor strip at a respective location; and
a back surface above the reference location of at least one associated linear sensor strip, extending perpendicular to a plane of the at least one associated linear sensor strip.

2. The object dimensioning apparatus of claim 1, wherein the at least one linear sensor strip comprises two linear sensor strips located in substantially coplanar relationship and oriented at a mutually included angle of 90°, and further comprising a back surface located above the reference location of each linear sensor strip and extending transverse to a longitudinal axis of that linear sensor strip.

3. The object dimensioning apparatus of claim 2, wherein an end of one of the two linear sensor strips proximate the reference location thereof overlaps an end of the other of the two linear sensor strips proximate the reference location thereof.

4. The object dimensioning apparatus of claim 2, wherein the back surfaces meet and form a corner.

5. The object dimensioning apparatus of claim 2, further comprising a third linear sensor strip oriented perpendicular to the two linear sensor strips and substantially coplanar with one of the two back surfaces.

6. The object dimensioning apparatus of claim 2, further comprising one of an ultrasound distance sensor and a laser range sensor over the two linear sensor strips aimed toward and substantially perpendicular to a plane of the two linear sensor strips proximate the reference locations of each of the two linear sensor strips.

7. The object dimensioning apparatus of claim 1, wherein the at least one linear sensor strip comprises two linear sensor strips located in substantially coplanar, mutually parallel and laterally offset relationship and the back surface is above a distal end of one of the two linear sensor strips and oriented transverse to a longitudinal axis thereof.

8. The object dimensioning apparatus of claim 7, wherein mutually proximate ends of the two linear sensor strips overlap longitudinally.

9. The object dimensioning apparatus of claim 1, further comprising a microprocessor having memory associated therewith and operably coupled to the at least one linear sensor strip, and an input device and an output device operably coupled to the microprocessor.

10. The object dimensioning apparatus of claim 9, wherein the output device comprises at least one of a display and a network interface.

11. The object dimensioning apparatus of claim 1, further comprising a scale positioned for weighing an object resting on the at least one linear sensor strip.

12. An object dimensioning apparatus, comprising:
a capacitive touchscreen sensor element with slider capability and configured to generate an outline of an object resting upon the sensor element responsive to a continuous touch about a periphery of the object.

13. The object dimensioning apparatus of claim 12, further comprising one of an ultrasound distance sensor and a laser range sensor over the capacitive touchscreen sensor element aimed toward and substantially perpendicular to a plane of the capacitive touchscreen sensor element.

14. The object dimensioning apparatus of claim 12, further comprising a linear sensor element oriented perpendicular to the capacitive touchscreen sensor element.

15. A method of determining at least one dimension of an object, comprising:
placing an object on at least one linear sensor strip oriented in a horizontal plane and comprising a resistive touchscreen configured to, responsive to touch, generate a signal corresponding to a linear distance of any respective location only along a longitudinal axis of the at least one linear sensor strip with respect to a reference location responsive to touch of the at least one linear sensor strip at a respective location;
placing an object on the at least one linear sensor strip with a side thereof adjacent the reference location;
touching the at least one linear sensor strip on at least one location thereon adjacent another side of the object opposite the side to generate a signal; and
determining, responsive to the signal and using a processor, a linear distance of the at least one location with respect to the reference location, the linear distance corresponding to a dimension of the object between the side and the another side thereof.

16. A method of determining at least one dimension of an object, comprising:
placing an object on a capacitive touchscreen sensor element with slider capability and configured to generate a signal representative of an outline of an object resting upon the sensor element responsive to a substantially continuous touch about a periphery of the object;
touching the sensor element substantially continuous about a periphery of the object; and
determining, responsive to the signal and using a processor, at least one dimension of the object.

* * * * *